April 27, 1965
F. R. BRAVENEC
3,181,057
INDUCTION-GUARD WELL LOGGING SYSTEM WITH
ELECTROSTATIC SHIELD GUARD ELECTRODES
Filed Sept. 19, 1960
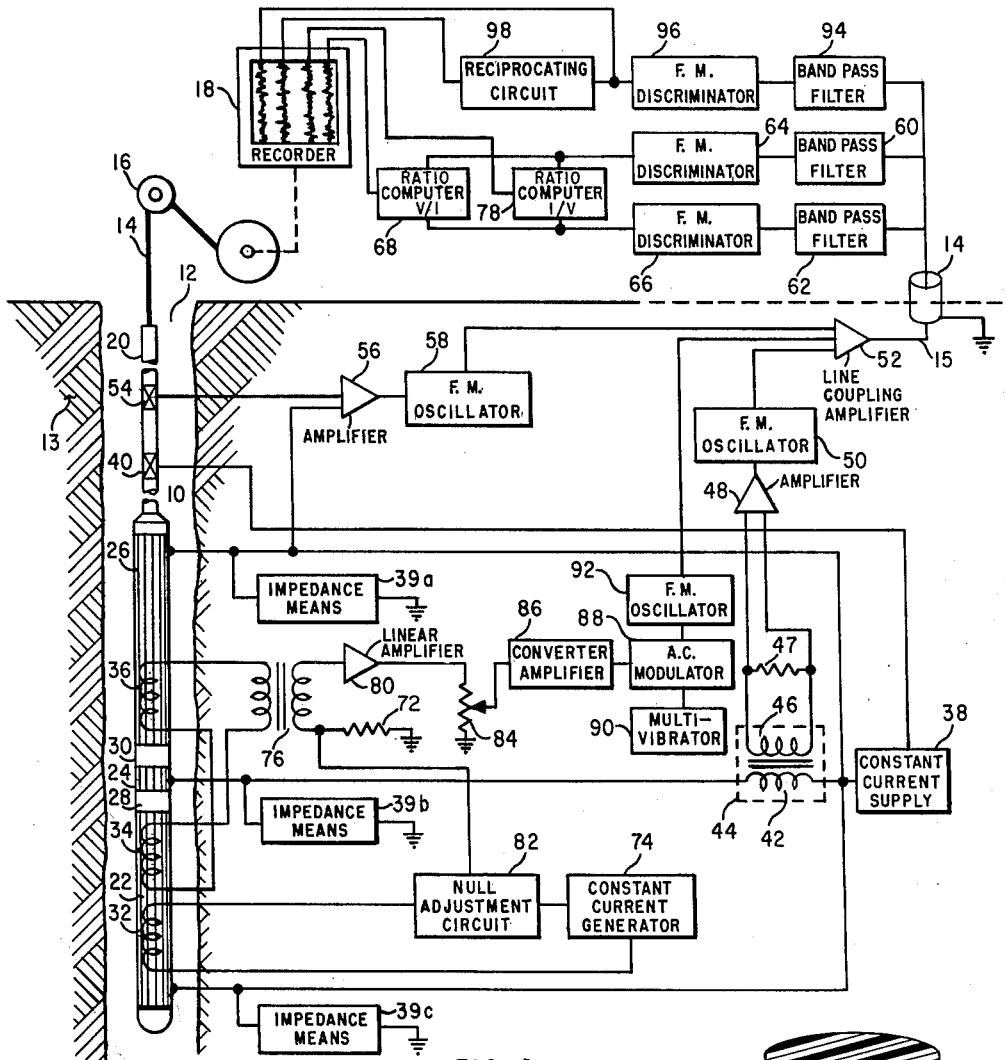
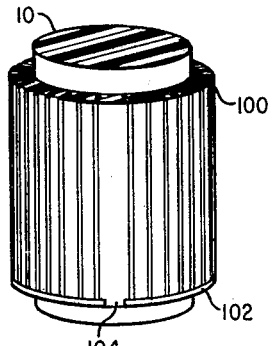
FIG. 2
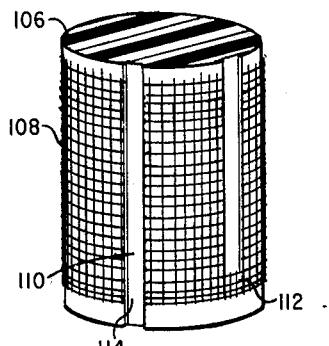
FIG. 3
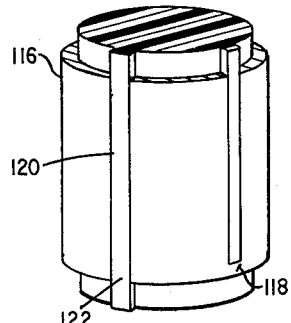
FIG. 4
INVENTOR.
Frank R. Bravenec,
BY Lyon and Lyon.
ATTORNEYS 3,181,057
INDUCTION-GUARD WELL LOGGING SYSTEM WITH ELECTROSTATIC SHIELD GUARD ELECTRODES
Frank R. Bravenec, Houston, Tex., assignor to Halliburton Company, a corporation of Delaware
Filed Sept. 19, 1960, Ser. No. 56,955
17 Claims. (Cl. 324—1)

This invention generally relates to the measurement of the electrical characteristics of earth formations traversed by a well bore and more particularly relates to a new and improved system for obtaining such measurements and for producing logs thereof.

One type of electrical logging presently in commercial use is made with a logging tool upon which is mounted an exploring or probe electrode and at least two guard electrodes mounted on either side of the probe electrode. Substantially the same potential difference is maintained at all the electrode surfaces with respect to a remote reference. When thus provided, the current flow from the probe electrode to a remote return is distributed through a zone of surrounding earth formation which has the configuration of a thin disk disposed normal to the well bore. The current density along the entire electrode array varies with immediately adjacent formation, depending on its conductivity, but only the current flow from the center section of the electrode is measured as a characteristic of the conductivity of the disk shaped zone. The voltage between the electrodes and the remote reference is also measured and the ratio of the potential and the current density may be used to establish the conductivity of the disk shaped zone. This focused system of logging is commonly referred to as "guard electrode" logging. More discussion in regard to such guard electrode logging systems may be found by reference to U.S. Patent No. 2,446,303 to Owen.

Another type of system for electrical measurement of earth formations is made by lowering a well logging tool mounting two or more coils, designated as a receiver coil (or coils) and a transmitter coil (or coils), which are supported in insulated and spaced apart co-axial relation. The transmitter coil group is excited by an alternating current to produce an electromagnetic flux field which induces eddy currents in the surrounding earth formation. Such eddy currents produce a secondary flux field which in turn induces a voltage in the receiver coil group which is at substantially 180° (herein termed in-phase) with respect to the transmitter current. Voltages also may be directly induced in the receiver coil group by the transmitter coil group which voltages are in quadrature relation with the transmitter coil current.

By providing at least three of such coils with two of such coils connected together to form a receiver or transmitter group, and providing the coils of selected turns and spacing, the directly induced voltage may be reduced or eliminated.

More important, however, is that the relative positions and turns of the coils cause the eddy currents induced in some zones of a surrounding conductive medium to be more or less influential on one receiver coil than another. Thus, any signal derived from a zone having a common influence on both coils may be nulled and such zone will effect no resulting signal. For example, if the well bore is filled with a conductive drilling mud, the masking effects of the conductivity of the mud may be minimized or eliminated whereby the net voltage of the receiver coil will be more nearly responsive to the conductivity of a prescribed zone of surrounding formation.

The guard system and the induction logging system each yields results which are directly related to the true conductivity or resistivities ($R_t$) of surrounding earth formation when utilized under proper conditions. For the guard system, the resistivity of the drilling mud filtrate ($R_{mf}$) and the resistivity of the formation connate water ($R_w$) should be in relation of $$\frac{R_{mf}}{R_w} < 10$$

In the case of the induction tool measurement, the true resistivity of the formation is approached under conditions where $$\frac{R_{mf}}{R_w} > 5$$

Under conditions other than stated, both systems measure predominately the formation zone that has been invaded by drilling fluids while drilling the well (invaded zone).

Additionally, the two systems are diversely affected by formation bed thickness. The guard system will yield values approaching $R_t$ in zones thicker than five and one-half feet when the resistivity of adjacent formation is less than the zone of interest or for zones thicker than three feet when the adjacent formation is of resistivity greater than the zone of interest. Normally, the first situation (five and one-half feet or greater) exists when the zones of interest are bounded by shale and the second condition exists when the zone of interest is bounded by dense lime or dolomite, for example.

The guard log will yield superior results in delineating thin beds where the proper $$\frac{R_{mf}}{R_w}$$

ratio exists.

It is to be noted that where $$5 < \frac{R_{mf}}{R_w} < 10$$

both systems will indicate $R_t$ only approximately in respect to ideal conditions.

In many wells, the contrast between $R_w$ of different formations is very large, causing large changes in value of $$\frac{R_{mf}}{R_w}$$

over portions of the well bore. These changes are often large enough to cause error in the determination of $R_t$ if either of the guard or induction log is run alone. In many wells, conditions also exist where use of the induction log is indicated but where some zones allow the measurement of $R_t$ with the guard log because of its inherently better thin bed definition. Under these conditions, it is desirable to run both the induction log and the guard log.

It is of course more expensive to separately run these logs for a particular well. Also, because of the elasticity of well logging cables and small variations of depth measurement, exact correlation of two separately run logs is difficult to attain with an acceptable degree of accuracy.

Previous attempts to provide a system for concurrently taking a guard log and an induction log were without success due, in part, to the extensive electrode configuration of the guard system which had deleterious effect upon the induction log if operated in the same vicinity. Highly conductive materials such as required for the guard log electrodes were found to cause unwanted signals in the induction log system, which were sufficiently larger in magnitude than the detected induction logging system that such a system was considered inoperable.

It is accordingly one object of the present invention to provide a new and improved system with which the induction and guard measurements may be simultaneously taken.

It is another object of this invention to provide a system wherein the induction and guard measurements may be simultaneously transmitted to the earth's surface.

It is another object of this invention to provide apparatus with which the induction and guard measurements may be taken without adverse effect to either measurement.

It is another object of the present invention to provide apparatus with which the induction and guard log may be recorded at earth's surface at a common depth reference.

In carrying out the present invention, apparatus is provided including a first and a second guard electrode mounted on a common axis and a probe electrode axially mounted between said guard electrodes. A current supply means provides a first alternating current of first frequency to a current return from each of the probe and guard electrodes at a substantially common potential. At least three coils are disposed in axially spaced apart relation with two of said coils in connection to provide a transmitter coil group and a receiver coil group. The electrodes are mounted in relation to electrostatically shield and to provide a common depth reference with the transmitter and the receiver coil groups. The electrodes are provided to prevent circumferential flow of current through the electrodes about the common axis. A current generator means provides a constant alternating current of second frequency through the transmitter coil group to electromagnetically produce eddy currents in surrounding earth formations. Impedance means connected between said electrodes and a ground prevents passage of current at the first frequency and allows free passage of current at the second frequency. A first detection means detects current flow through the probe electrode and produces a first signal and second detection means detects a potential between the electrodes and a remote potential reference and produces a second signal. A third detection means detects the voltage induced in said receiver coil group from the effect of formation eddy currents and produces a third signal. Transmitter means respectively transmits the first, the second, and the third signals. Ratio detection means receives the first and said second signals and produces an indication of an electrical characteristic of a zone of earth formation established by the probe electrode and the guard electrodes. Means receiving the third signal produces an indication of an electrical characteristic of a zone of earth formation established by the transmitter and the receiver coil groups.

For a better understanding of the invention, reference is made to the following detailed description, taken in conjunction with the accompanying drawing, in which:

FIGURE 1 is a schematic diagram of a logging system constructed in accordance with the present invention;

FIGURE 2 is an isometric view of one embodiment of a guard and/or probe electrode constructed in accordance with the present invention;

FIGURE 3 is an isometric view of another embodiment of such a guard and/or probe electrode; and FIGURE 4 is an isometric view of still another embodiment of such a guard and/or probe electrode.

Referring to FIGURE 1, there is shown a logging tool 10 suspended from a logging cable 14 into a well bore 12. Well bore 12 traverses a section of earth formation 13. A hoisting means 16 is provided in connection with logging cable 14 at the earth's surface to raise and lower tool 10 as required. In responsive connection with hoist 16 is a recorder 18 which is adapted to record the signals from logging tool 10 in correlation with an indication of the depth of tool 10 within the well bore. An insulating sheath 20 is connected above tool 10 to electrically insulate a portion of cable 14 from the surrounding well bore fluids. Mounted near the upper end of sheath 20 are a current return electrode 40 and a remote potential reference electrode 54. Mounted along the length of tool 10 are a lower guard electrode 22, a central probe electrode 24, and an upper guard electrode 26. Insulator sections 28 and 30 are disposed above and below the probe electrode 24 to electrically insulate the probe electrode from the guard electrodes 22 and 26.

A constant current of low frequency, for example 200 c.p.s., is connected in parallel to electrodes 22, 24 and 26 and in series with current return electrode 40 to provide current flow from between the electrodes and return electrode. As connected, such constant current supply provides a practically equal potential between each of electrodes 22, 24 and 26 as well as unrestricted current flow. Means are provided to detect the current flow through probe electrode 24 and to detect the potential existing between electrodes 22, 24 and 26 and the remote potential reference electrode 54. As previously mentioned, the ratio of the detected potential and the detected current is proportional to the specific resistivity of a disk shaped zone of surrounding earth formation which is approximately the thickness of the length of the probe electrode 24. Means for providing such current supply, detection and ratio determination functions will be later described in detail.

An electromagnetic field generator coil 32 is provided in spaced apart relation to a receiver coil 36. Disposed in spaced apart relation from generator coil 32 is an auxiliary receiver coil 34, connected in series opposition to receiver coil 36. As previously mentioned, the induction system may be provided with one or more generator coils and one or more receiver coils as desired to minimize the conductivity of the bore hole fluids and/or to emphasize the conductivity of well formations in selected zones about the bore hole. A single transmitter coil and two receiver coils are herein illustrated by example only and for simplicity in describing the invention.

The generator coil (or coils) and the receiver coil (or coils) are fabricated into an elongated cylindrical assembly which is constructed of insulating and non-magnetic materials, such as glass cloth, epoxy resins, neoprene, rubber, etc. The spacing and turns of the coils 32, 34, and 36 are first selected to emphasize a particular zone of surrounding earth formation having an effective or central depth at the same level as probe electrode 24. Means later described is provided to supply a constant alternating current of relatively high frequency through transmitter coil 32, for example 20,000 c.p.s. Receiver coils 34 and 36 are connected into signal detection transmission, and recording means as later described.

The turns and spacing of the coils 32, 34 and 36 are also selected to null, inasfar as possible, any voltage directly induced into the receiver coil group by the transmitter coil group. However, other voltage components may be induced into the receiver coil group not only by the transmitter coil but also by electrostatic effects, which are not readily susceptible to precise determination, and also by the relative conductivity of the bore hole and the conductivity of the surrounding formation which tend to upset the initial relation established by the turns and spacing of the coils. It has been found, if the transmitter-receiver coil array is electrostatically shielded with the shielding connected to ground, that much of the adverse electrostatic effects may be eliminated.

As provided by the present invention, the electrodes 22, 24 and 26 are mounted adjacent to the transmitter-receiver coils in a manner providing electrostatic shielding for the coils. Such shields are desirably grounded and, for this purpose, each of electrodes 26, 24 and 22 are respectively grounded through an impedance means 39a, 39b and 39c. As provided, each impedance means may be a high pass filter network of the active or passive type or, in the simplest embodiment, a capacitor. As provided, each impedance means provides a very low impedance to ground for high frequencies and sufficiently high impedance to ground for low frequencies. At the frequencies herein exampled, a .1 mf. capacitor will have an impedance of 100 ohms at 20 kc. and 10,000 ohms at 200 c.p.s.

If the electrodes 22, 24 and 26 are provided entirely around tool 10, the flux set up by transmitter coil 32 would tend to create eddy currents only in the electrodes and would preclude the use of the induction array as provided. To avoid this problem, the electrodes are each provided of interrupted path around the tool 10 and are preferably provided of several interrupted paths around tool 10.

FIGURE 2 illustrates one embodiment of a short section of either the guard electrode 22 and 26 or the probe electrode 24, all of which may be of identical construction. As shown, the electrodes 22, 24 and 26 are made of thin laminations or strips 100 disposed along the length of and radially with respect to the circumference of the tool 10 and connected in common to an angular plate or washer 102 at one end. Similar washers may be provided along the length or at the other end of the electrode when required (not shown). The strips 100 and washers 102 are of conductive but non-magnetic material such as brass or bronze, for example. Each washer is provided with a gap 104 as shown, so that no complete circumferential electrical path exists in proximity with the induction coil array. The spaces between the metal strips 100 and the gap at 104 are desirably filled with an insulating material such as rubber or resin impregnated fiber glass to give structural rigidity to the tool and also to electrically insulate the conductive strips 100 one from another.

FIGURE 3 presents an alternate embodiment of the electrode section shown in FIGURE 2. As shown, a mandrel of fiber glass or reinforced plastic 106 is wrapped with a conductive wire mesh generally shown as brass or copper screen wire 108, which is impregnated with plastic material such as epoxy resin. After curing, one or more longitudinal slots are milled in the wire in the impregnated wire mesh, leaving at least one thin conductive band 112 along the electrodes. A single slot 114 is milled in band 112 to prevent circumferential flow of current.

FIGURE 4 illustrates still another embodiment of the electrode section shown in FIGURE 2. As shown, a mandrel as previously described is enclosed within a solid brass or bronze covering 116 and attached thereto by cementing or other well known fastening means. One or more longitudinal slots 120 are milled in the metallic covering, leaving a thin conductive band 118 at least one point on the electrode. A single slot is milled in each band 118 to prevent the circumferential flow of current. The slots are filled with plastic, etc.

It will be apparent that these various embodiments, i.e., those of FIGS. 2, 3 or 4, actually provide what may be denominated as a distributed guard electrode which is arrayed over the surface of the apparatus in circumferentially discontinuous fashion. The electrode distribution is such as to provide a current distribution compatible with the requirements of the guard logging system, but, at the same time, not interfere with the magnetic field radiation of the underlying induction coils. This distributed guard electrode further operates as an electrostatic shield to effectively shield the induction coils from the effects of electrostatic coupling thereof with the borehole fluids.

As seen in FIGURE 1, a constant current supply 38, at a low frequency of 200 c.p.s. for example, is connected in parallel to electrodes 22, 24 and 26. Currrent supply 38 is also connected to return electrode 40 to provide a series circuit including the supply 38, electrodes 22, 24 and 26, surrounding earth formation, and return electrode 40. Electrode 40 is mounted on sheath 20 at a relatively large distance, for example 40 feet, from the current electrode 24.

A primary 42 of a current transformer 44 is connected in series between the probe electrode 24 and current supply 38 for the purpose of measuring the flow of current passing between probe electrode 24 and return electrode 40. The primary winding 42 is of sufficiently low impedance, for example .1 ohm or lower, to cause the current electrode to be at the same potential as are the guard electrodes 22 and 26 for all practical purposes. A measuring resistor 47 is connected across a secondary 46 of transformer 44 and the input of an amplifier 48. The output of amplifier 48 is an alternating current voltage indicative of the flow of current through primary 42. This output voltage is coupled to the input of a frequency modulated (FM) oscillator 50, generally termed a transmitter. The output of transmitter 50 is coupled through a line coupling amplifier 52 onto a conductor 15 of logging cable 14 for transmission to the surface of the earth.

A voltage amplifier 56 is connected between the remote potential reference electrode 54 and any one of electrodes 22, 24 or 26. The output of amplifier 56 is coupled in modulating relation to an FM oscillator transmitter 58. The output of transmitter 58 is also coupled through line coupling amplifier 52 to conductor 15.

The power supply circuits required for the previously and subsequently mentioned circuitry are of conventional nature which may be operated by alternating current power voltage supplied through conductor 15 and have been omitted throughout FIGURE 1 for purposes of simplicity.

A constant alternating current generator 74 is connected in series with transmitter coil 32. Generator 74 is operated at relatively high frequency, 20 kc. being a preferred example. For details of a generator circuit presently in use, reference may be had to U.S. Patent No. 2,928,039 to Huddleston.

The series opposed receiver coils 34 and 36 are series connected with the primary of a receiver input transformer 76. One terminal of the secondary of transformer 76 is connected through a summing resistor 72 to ground and the other terminal through a linear amplifier 80 and a sensitivity potentiometer 84 to ground.

A null adjustment circuit 82 is connected into the generator coil circuit and connected across the summing resistance 72 to ground. As before explained, a predominate amount of the voltage directly induced in the receiver coils 34 and 36 by coil 32 may be obviated by proper selection of the turns and spacings of the coils. However, residual and undesirable voltage components are present in the voltage induced in the receiver coils which are representative of physical distortion of tool 10, peculiar conductive conditions of surrounding formation, residual capacity effects, etc. The output of null adjustment 82 is provided of selected amplitude and phase relation to null such undesirable voltage components under particular conditions established by tool 10 in a well bore.

The output of linear amplifier 80 is a signal voltage of amplitude proportional to the conductivity of the prescribed zone of adjacent formation and of frequency established by generator 74.

A linear converter amplifier 86 is connected to the tap of potentiometer 84 and converts the alternating current signal voltage to a corresponding D.C. signal. This D.C. signal is fed into an alternating current modulator 88 which provides a subcarrier modulating voltage output connected into the input of a frequency transmitter oscillator 92. Modulator 88 is driven by a multivibrator 90. Transmitter 92 may be provided to operate about a center frequency of 14 kc., for example. The output of transmitter 92 is coupled through coupling amplifier 52 to conductor 15.

At the earth's surface, conductor 15 is respectively connected into band pass filters 62, 60 and 94 which separate the three signals respectively transmitted from transmitters 50, 58 and 92. The output of filters 62, 60, 94 are respectively connected into frequency modulated discriminators 66, 64 and 96 which recover the intelligence signal originally modulating the transmitter 50, 58 and 92.

The output of discriminator 96 actuates recorder 18 to record the conductivity of the zone of surrounding earth formation as determined by the induction coil array. If desired, the output of discriminator 96 may be fed into a voltage reciprocating circuit 98 to produce an output which is representative of the resistivity of such zone of earth formation. The output of reciprocator 98 may be connected into recorder 18 to provide a record of such resistivity.

The outputs of discriminators 64 and 66 are coupled in parallel to a ratio computing circuit 68 and 78 which produce outputs representing the conductivity $V/I$ and resistivity $I/V$ respectively. The outputs of computor 68 and 78 are connected to actuate recorder 18 to record the resistivity and conductivity of the zone explored by probe electrode 24 in correlation with its depth. For more details in regard to frequency modulated well logging systems, reference may be made to U.S. Patent No. 2,573,133 to Greer.

As previously mentioned, the coil system illustrated may be replaced by a coil system wherein several coils are provided in both the transmitter and receiver coil group. For example, a presently used commercial system is comprised of two transmitter coils of varying turns and spacing and three receiver coils of varied turns and spacing. The turns ratio and relative position of the various coils are determined by the desired response related to a prescribed zone of investigation.

In operation, the constant current supply 38 maintains an essentially common potential on the guard electrodes 22 and 26 and the proble electrode 24. The current density varies along the entire electrode assembly responsive to the resistivity of the earth formation adjacent to each part of the assembly. Only the current flow from the small probe electrode 24 is measured through the primary 42 of transformer 44.

By virtue of the equal potential surfaces existing on the guard electrodes 22 and 26 and the probe electrode 24, the current measured from probe electrode 24 is representative of a thin sheet of formation normal to the well bore which extends for a distance determined by the conductivity of the adjacent formation and bore hole fluids, etc., as well as the distance from the probe electrode 24 to the current return electrode 40.

The potential difference existing between the electrodes 22, 24 and 26 and the reference electrode 54 is amplified by amplifier 56 to modulate the transmitter 58.

The outputs of transmitters 50 and 58 are received respectively through the band pass filters 60 and 62 and discriminated by discriminators 64 and 66. The output of discriminators 64 and 66 are fed into either or both of ratio computors 68 and 78 which outputs are indications of earth formation conductivity and resistivity respectively of the disk configuration of earth formation travelled by the current through probe electrode 24 and are recorded by recorder 18 in correlation with the depth of the probe electrode 24.

The transmitter coil 32 provides a constant alternating flux field in the surrounding formations. This field induces eddy currents in the formations which are concentric to the axis of the coil. The induced eddy currents produce secondary flux fields which induce a voltage in the receiver coils 34 and 36 proportional to the conductivity of the zone of adjacent formation which has been selected.

As previously mentioned, the coils of the induction system should be electrostatically shielded to prevent capacity coupling between the coils and surrounding conductive media. Such shielding structure is provided for the coils by the guard electrodes 22, 24 and 26 as illustrated in FIGURE 1, taken in view of FIGURES 2, 3 or 4. Such electrodes provide electrostatic shielding of the induction coils since the electrodes are of common potential and essentially at ground potential with respect to the operating frequency of the coil array as provided by the impedance means 39a, 39b, and 39c.

The resulting voltage induced in the receiver coils 34 and 36 is calibrated by null adjustment circuit 82 and coupled through transformer 76, amplifier 80 and potentiometer 84 into amplifier 86. The D.C. output of amplifier 86 is modulated by modulator 88 to modulate transmitter 92. The output of transmitter 92 is fed through amplifier 52 and conductor 15, band pass filter 94 to discriminator 96. The output of discriminator 96 is an indication of the conductivity of the zone of the earth formation selected by the coil array and is recorded by recorder 18 in correlation with the effective depth of such zone which, as provided by the present invention, is desirably at the same depth as probe electrode 24.

It is seen that the apparatus as described provides a measure of conductivity at a common depth reference of a zone established by electrode 24 in interaction with guard electrodes 22 and 26 and another zone established by the turns and positions of the induction coil array. Additionally, the apparatus will provide respective indications of the resistivities of such zones.

Other modifications of the invention as disclosed will become apparent to those skilled in the art. The system as described herein is intended only to serve as an illustration of example embodiments and various changes may be made without departing from the spirit of the invention as coming within the scope of the appended claims.

That being claimed is:

1. Apparatus of the type described comprising, a body, a first and a second guard electrode coaxially mounted on said body, a probe electrode mounted between and coaxially with said guard electrodes, a current return electrode spaced from said probe and guard electrodes, a reference electrode remote from said probe and guard electrodes, current supply means connected between said probe and guard electrodes and said current return electrode providing a first alternating current of a first frequency through surrounding earth formation to said current return electrode from each of said probe and guard electrodes, said probe and guard electrodes being maintained at substantially the same potential, a transmitter coil and a receiver coil disposed in axially spaced relation to one another and in coaxial relation to said probe and guard electrodes, said guard electrodes comprising an electrostatic shield substantially enveloping said transmitter and receiver coils so as to electrostatically shield the same and to provide a common effective depth reference therewith, current generator means providing a constant alternating current of second frequency through said transmitter coil to electromagnetically produce eddy currents in surrounding earth formations, impedance means connected between said probe and guard electrodes and ground preventing passage of current at said first frequency and allowing free passage of current at said second frequency, first detection means detecting current flow through said probe electrode and producing a first signal, second detection means detecting the potential between said probe and guard electrodes and said reference electrode and producing a second signal, third detection means detecting the voltage induced in said receiver coil by formation eddy currents and producing a third signal, transmitter means respectively transmitting said first, said second, and said third signals, ratio detection means receiving said first and said second signals and producing an indication of an electrical characteristic of earth formation disposed horizontally to said probe electrode, and means receiving said third signal and producing an indication of an electrical characteristic of earth formation influencing said transmitter coil and said receiver coil.

2. Apparatus of the type described comprising, a first and a second guard electrode, a probe electrode mounted between said guard electrodes, a current return electrode and a reference electrode respectively spaced and remote from said probe and guard electrodes, current supply means connected between said probe and guard electrodes and said current return electrode providing a first alternating current of first frequency to said current return electrode from each of said probe and guard electrodes, a group of at least three coils disposed in axially spaced relation with two of said coils in connection to provide first and second units of said group, one of said units comprising a transmitter and one of said units comprising a receiver, said guard electrodes comprising an electrostatic shield substantially enveloping said transmitter and receiver so as to electrostatically shield the same, current generator means providing a constant alternating current of second frequency through said transmitter, impedance means connected between said probe and guard electrodes and ground preventing passage of current at said first frequency and allowing free passage of current at said second frequency, first detection means detecting current flow through said probe electrode and producing a first signal, second detection means detecting the potential between said probe and guard electrodes and said reference electrode and producing a second signal, third detection means detecting the voltage induced in said receiver and producing a third signal, transmitter means respectively transmitting said first, said second, and said third signals, ratio detection means receiving said first and said second signals and producing an indication of an electrical characteristic of earth formation disposed horizontally to said probe electrode, and means receiving said third signal and producing an indication of an electrical characteristic of earth formation influencing said transmitter and said receiver.

3. The apparatus of claim 2 wherein said probe and guard electrodes have a common axis and are each comprised of conductive strips longitudinally mounted and circumferentially spaced about said common axis and commonly connected to a conductor extending incompletely around said axis.

4. The apparatus of claim 3 wherein said conductive strips are comprised of a conductive mesh mounted about said common axis, said mesh having a plurality of longitudinal slots cut therein to form said strips.

5. The apparatus of claim 3 wherein said conductive strips are comprised of a conductive plate mounted about said common axis, said plate having a plurality of longitudinal slots cut therein to form said strips.

6. Apparatus of the type described comprising, a first and a second guard electrode mounted on a common axis, a probe electrode mounted between said guard electrodes, a current return electrode and a reference electrode respectively spaced and remote from said probe and guard electrodes, current supply means connected between said probe and guard electrodes and said current return electrode providing a first alternating current of first frequency to said current return electrode from each of said probe and guard electrodes, said probe and guard electrodes being maintained at substantially the same potential, a group of at least three coils disposed in axially spaced relation with two of said coils in connection to provide first and second coil units of said group, one of said units comprising a transmitter and one of said units comprising a receiver, said guard electrodes comprising an electrostatic shield substantially enveloping said transmitter and receiver so as to electrostatically shield the same and to provide a common effective depth reference therewith, current generator means providing a constant alternating current of second frequency through said transmitter to electromagnetically produce eddy currents in surrounding earth formations, first detection means detecting current flow through said probe electrode and producing a first signal, second detection means detecting the potential between said probe and guard electrodes and said reference electrode and producing a second signal, third detection means detecting the voltage induced in said receiver from the effect of formation eddy currents and producing a third signal, and transmitter means respectively transmitting said first, said second, and third signals, ratio detection means receiving said first and second signals and producing an indication of an electrical characteristic of earth formation disposed horizontally to said probe electrode, and means receiving said third signal and producing an indication of an electrical characteristic of earth formation influencing said transmitter and said receiver.

7. The apparatus of claim 6 wherein said probe and guard electrodes are each comprised of conductive strips longitudinally mounted and circumferentially spaced about said common axis and commonly connected to a conductor extending incompletely around said axis.

8. The apparatus of claim 7 wherein said conductive strips are comprised of a conductive mesh mounted about said common axis, said mesh having a plurality of longitudinal slots cut therein to form said strips.

9. The apparatus of claim 7 wherein said conductive strips are comprised of a conductive plate mounted about said common axis, said plate having a plurality of longitudinal slots cut therein to form said strips.

10. Apparatus of the type described comprising, a first and a second elongated guard electrode mounted on a common axis, a probe electrode mounted between said guard electrodes, a current return electrode and a reference electrode respectively spaced and remote from said probe and guard electrodes, current supply means connected between said probe and guard electrodes and said current return electrode providing a first alternating current of first frequency to said current return electrode from each of said probe and guard electrodes, said probe and guard electrodes being maintained at substantially the same potential, a group of at least three coils disposed in axially spaced relation with two of said coils in connection to provide first and second coil units of said group, one of said units comprising a transmitter and one of said units comprising a receiver, said guard electrodes comprising an electrostatic shield substantially enveloping said transmitter and receiver so as to electrostatically shield the same and to provide a common effective depth reference therewith, current generator means providing a constant alternating current of second frequency through said transmitter to electromagnetically produce eddy currents in surrounding earth formation, impedance means connected between said probe and guard electrodes and ground preventing passage of current at said first frequency and allowing free passage of current at said second frequency, first detection means detecting current flow through said probe electrode and producing a first signal, second detection means detecting the potential between said probe and guard electrodes and said reference electrode and producing a second signal, and third detection means detecting the voltage induced in said receiver from the effect of formation eddy currents and producing a third signal.

11. The apparatus of claim 10 wherein said probe and guard electrodes are each comprised of conductive strips longitudinally mounted and circumferentially spaced about said common axis and commonly connected to a conductor extending incompletely around said axis.

12. The apparatus of claim 11 wherein said conductive strips are comprised of a conductive mesh mounted about said common axis, said mesh having a plurality of longitudinal slots cut therein to form said strips.

13. The apparatus of claim 11 wherein said conductive strips are comprised of a conductive plate mounted about said common axis, said plate having a plurality of longitudinal slots cut therein to form said strips.

14. Apparatus of the type described comprising, a first and a second guard electrode mounted on a common axis, a probe electrode mounted between said guard electrodes, a current return electrode and a reference electrode respectively spaced and remote from said probe and guard electrodes, current supply means connected between said probe and guard electrodes and said current return electrode providing a first alternating current of first frequency to said current return electrode from each of said probe and guard electrodes, said probe and guard electrodes being maintained at substantially the same potential, a group of at least three coils disposed in axially spaced relation with two of said coils in connection to provide first and second coil units of said group, one of said units comprising a transmitter and one of said units comprising a receiver, said guard electrodes comprising an electrostatic shield substantially enveloping said transmitter and receiver so as to electrostatically shield the same and to provide a common effective depth reference therewith, current generator means providing a constant alternating current of second frequency through said transmitter to electromagnetically produce eddy currents in surrounding earth formations, first detection means detecting current flow through said probe electrode and producing a first signal, second detection means detecting the potential between said probe and guard electrodes and said reference electrode and producing a second signal, and third detection means detecting the voltage induced in said receiver from the effect of formation eddy currents and producing a third signal.

15. The apparatus of claim 14 wherein said probe and guard electrodes are each comprised of conductive strips longitudinally mounted and circumferentially spaced about said common axis and commonlly connected to a conductor extending incompletely around said axis.

16. The apparatus of claim 15 wherein said conductive strips are comprised of a conductive mesh mounted about said common axis, said mesh having a plurality of longitudinal slots cut therein to form said strips.

17. The apparatus of claim 15 wherein said conductive strips are comprised of a conductive plate mounted about said common axis, said plate having a plurality of longitudinal slots cut therein to form said strips.

References Cited by the Examiner

UNITED STATES PATENTS

| | | | |
|---|---|---|---|
| 2,220,070 | 11/40 | Aiken | 324—6 |
| 2,415,364 | 2/47 | Mounce | 324—1 |
| 2,446,303 | 8/48 | Owen | 324—10 |
| 2,573,133 | 10/51 | Greer | 324—1 |
| 2,582,314 | 1/52 | Doll | 324—6 |
| 2,712,627 | 7/55 | Doll | 324—1 |
| 2,723,375 | 11/55 | Schuster | 324—6 |
| 2,788,483 | 4/57 | Doll | 324—6 |
| 2,790,138 | 4/57 | Poupon | 324—6 |
| 2,803,796 | 8/57 | Schuster | 324—1 |
| 2,928,038 | 3/60 | Huddleston | 324—1 |
| 2,930,969 | 3/60 | Baker | 324—10 |
| 3,054,046 | 9/62 | Holmes et al. | 324—10 X |
| 3,076,928 | 2/63 | Waters | 324—1 |
| 3,124,742 | 3/64 | Schneider | 324—1 |

WALTER L. CARLSON, *Primary Examiner.*

SAMUEL BERNSTEIN, FREDERICK M. STRADER, *Examiners.*